United States Patent [19]

Okawa et al.

[11] Patent Number: 5,506,291

[45] Date of Patent: Apr. 9, 1996

[54] POLYIMIDE RESIN COMPOSITION HAVING EXCELLENT FATIGUE RESISTANCE AND INJECTION MOLDED ARTICLE OF SAME

[75] Inventors: Yuichi Okawa; Yoshihiro Sakata; Wataru Yamashita; Katsuaki Iiyama; Shoji Tamai; Akihiro Yamaguchi, all of Kanagawa, Japan

[73] Assignee: Mitsui Toatsu Chemicals, Inc., Tokyo, Japan

[21] Appl. No.: 321,750

[22] Filed: Oct. 12, 1994

[30] Foreign Application Priority Data

Dec. 27, 1993 [JP] Japan .................................. 5-332003
Apr. 20, 1994 [JP] Japan .................................. 6-081380

[51] Int. Cl.⁶ .................................................. C08L 79/08
[52] U.S. Cl. .......................... 524/413; 524/493; 524/496; 524/538; 524/606; 525/436
[58] Field of Search ............................... 525/436, 432; 524/413, 493, 496, 606, 538

[56] References Cited

U.S. PATENT DOCUMENTS

| | | | |
|---|---|---|---|
| 4,552,931 | 11/1985 | St. Clair et al. .................. | 525/432 |
| 5,300,620 | 4/1994 | Okikawa et al. .................. | 528/172 |
| 5,380,805 | 1/1995 | Tamai et al. ....................... | 525/432 |

FOREIGN PATENT DOCUMENTS

| | | |
|---|---|---|
| 294129 | 12/1988 | European Pat. Off. . |
| 511813 | 11/1992 | European Pat. Off. . |

OTHER PUBLICATIONS

Patent Abstracts of Japan, vol. 10, No. 339 (C–385)(2395), Nov. 15, 1986 & JP-A-61143478 (Mitsui Toatsu Chemicals, Inc.) Jul. 1, 1986 *Abstract*.

*Primary Examiner*—Ana L. Carrillo
*Attorney, Agent, or Firm*—Burns, Doane, Swecker & Mathis

[57] ABSTRACT

A fatigue-resistant polyimide resin composition comprising 100 parts by weight of polyimide having from 0.5 (exclusive) to 1.0 (inclusive) mole ratio of recurring structural units represented by the formula (1)

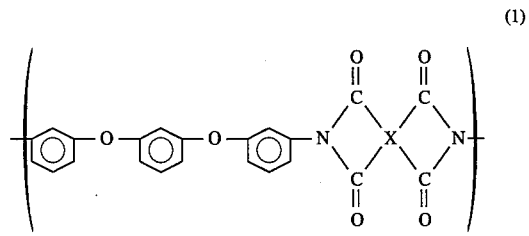

(1)

and from 0 (inclusive) to 0.5 (exclusive) mole ratio of recurring structural units represented by the formula (2):

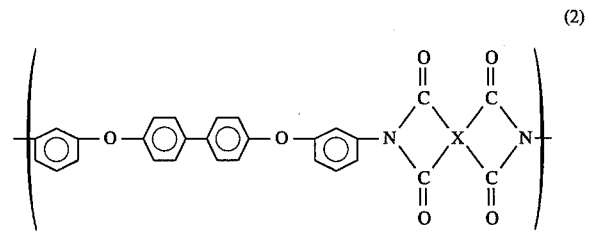

(2)

wherein X is

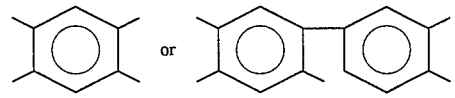

in the formulas (1) and (2), and having an inherent viscosity of 0.45 dl/g or more; and 5~65 parts by weight of a carbon fiber, glass fiber, aromatic polyamide fiber and/or potassium titanate fiber, and an injection molded article having a high fatigue resistance.

16 Claims, No Drawings

POLYIMIDE RESIN COMPOSITION HAVING EXCELLENT FATIGUE RESISTANCE AND INJECTION MOLDED ARTICLE OF SAME

BACKGROUND OF THE INVENTION

1. Field of the Invention

The present invention relates to a fatigue-resistant polyimide resin composition and an injection molded article of the same, and more particularly relates to a polyimide resin composition having good melt-processing ability and excellent fatigue resistance and an injection molded article obtained from the polyimide resin composition.

2. Description of the Related Art

Conventionally, polyimide has a high heat resistance, excellent mechanical strength and outstanding dimensional stability and additionally has flame retardance and electrical insulation property. Thus, polyimide has been widely used in the fields of electric and electronic appliances, space and aeronautic equipment and transport machinery. Various kinds of polyimides which exhibit excellent properties have been conventionally developed. However, some polyimide has no distinct glass transition temperature although heat resistance is excellent, and must be processed with specialized techniques such as sinter molding in the case of being used as a molded material. Other polyimide is excellent in processing ability. On the other hand, such polyimide has a low glass transition temperature and additionally is soluble in halogenated hydrocarbon solvents, and is unsatisfactory in view of resistance to heat and solvent. Thus, conventional polyimide has exhibited both merits and drawbacks in terms of properties.

In order to solve these problems, the present inventors have developed polyimide and various copolyimides which can be melt-processed and are excellent in mechanical strength, heat resistance, electrical property and chemical resistance (Japanese Laid-Open Patent SHO 61-143478 and HEI 3-47837). However, dynamic mechanical properties such as fatigue property have not been examined to a great extent and almost no information can be found under the existing circumstances in the fields of an injection-moldable high-heat-resistance polyimide which has been developed particularly in recent years.

SUMMARY OF THE INVENTION

An object of the invention is to provide a polyimide resin composition which can be melt processed by injection molding and other means and has high fatigue resistance, and an injection molded article prepared from the composition.

As a result of an intensive investigation in order to solve the above problems, the present inventors have found that a polyimide resin composition obtained by using polyimide having a specific structure and a molecular weight above a certain level exhibits excellent melt-flow characteristics and moldability and that an injection molded article having outstanding fatigue resistance can be obtained from the resin composition. Thus, the invention has been completed.

That is, an aspect of the invention is:

(A) an extremely fatigue-resistant polyimide resin composition comprising 100 parts by weight of polyimide having from 0.5 (exclusive) to 1.0 (inclusive) mole ratio of recurring structural units represented by the formula (1):

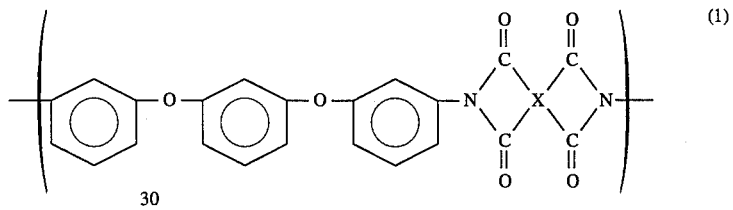

and from 0 (inclusive) to 0.5 (exclusive) mole ratio of recurring structural units represented by the formula (2):

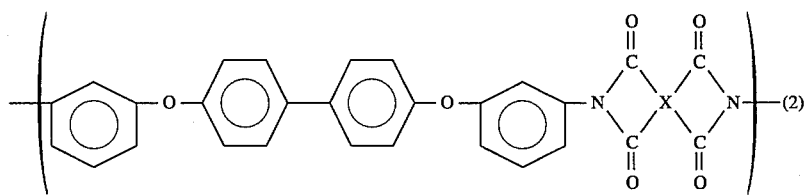

wherein x is

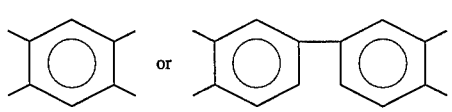

in the formulas (1) and (2), and having an inherent viscosity of 0.45 dl/g or more, and 5–65 parts by weight of a carbon fiber, glass fiber, aromatic polyamide fiber and/or potassium titanate fiber;

(B) an extremely fatigue-resistant polyimide resin composition comprising 100 parts by weight of polyimide having a polymer of capped molecular chain end obtained by preparing the polyimide of the above (A) in the presence of an aromatic dicarboxylic anhydride represented by the formula (3):

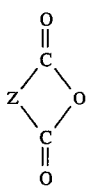

(3)

wherein Z is a divalent radical having 6–15 carbon atoms and is a monoaromatic radical, condensed polyaromatic radical or noncondensed aromatic radical connected to each other with a direct bond or a bridge member, and/or an aromatic monoamine represented by the formula (4):

V—NH₂  (4)

wherein V is a monovalentradical having 6–15 carbon atoms and is a monoaromatic radical, condensed polyaromatic radical or noncondensed aromatic radical connected to each other with a direct bond or a bridge member, and having an inherent viscosity of 0.45 dl/g or more, and 5–65 parts by weight of a carbon fiber, glass fiber, aromatic polyaromatic fiber and/or potassium titanate fiber; and (C) an injection molded article obtained from these polyimide resin compositions.

The polyimide resin compositions of the present invention can provide an injection molded article having a high fatigue resistance.

DESCRIPTION OF THE PREFERRED EMBODIMENTS

Polyimide used in the invention is a homopolymer or a copolymer of polyimide having in a polymer molecule from 0.5 (exclusive) to 1.0 (inclusive) mole ratio of recurring structural units represented by the formula (1):

wherein X is

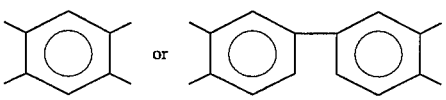

and from 0 (inclusive) to 0.5 (exclusive) mole ratio of recurring structural units represented by the formula (2):

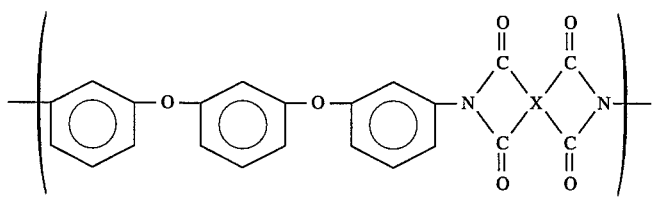

(1)

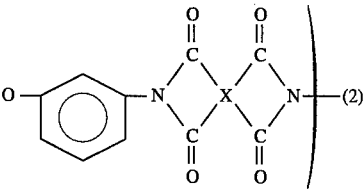

(2)

wherein X is

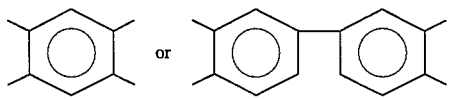

That is, the polyimide homopolymer consists of recurring structural units represented by the formula (1) and does not contain recurring structural units represented by the formula (2).

In practice, each polyimide homopolymer has recurring structural units of the formula (1-1) alone;

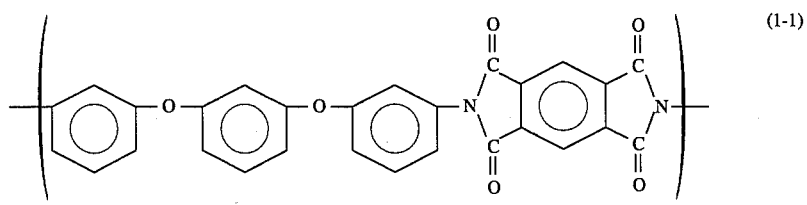
(1-1)

or the formula (1-2) alone;

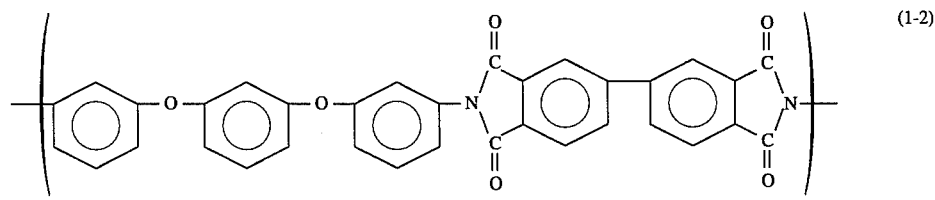
(1-2)

Further, the polyimide copolymer used in the invention comprises more than 0 to less than 0.5 mole ratio of recurring structural units represented by the formula (2) and more than 0.5 to less than 1.0 mole ratio of recurring structural units represented by the formula (1).

More particularly, representative copolymers include a polyimide copolymer which comprises recurring structural units of the formula (1-1)

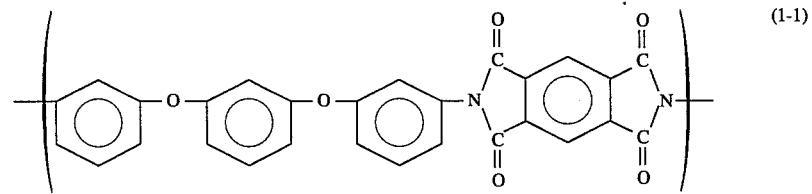
(1-1)

in an amount of more than 0.5 to less than 1.0 mole per mole of the polymer molecule and recurring structural units of the formula (2-1):

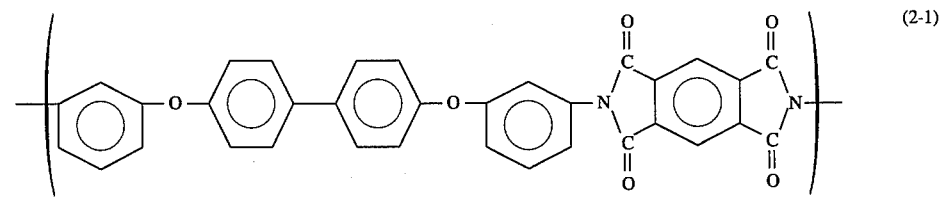
(2-1)

and/or recurring structural units of the formula (2-2):

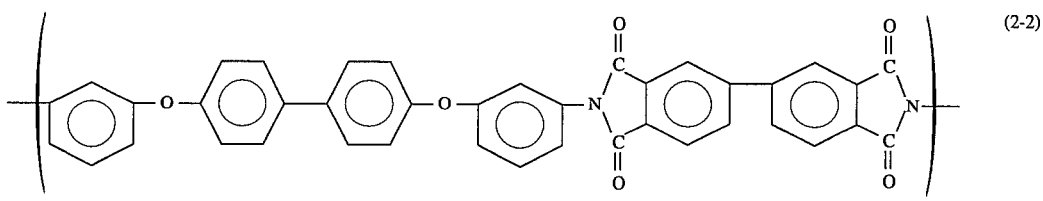

in an amount of more than 0 to less than 0.5 mole per mole of the polymer molecule; and a polyimide copolymer which comprises recurring structural units of the formula (1-2):

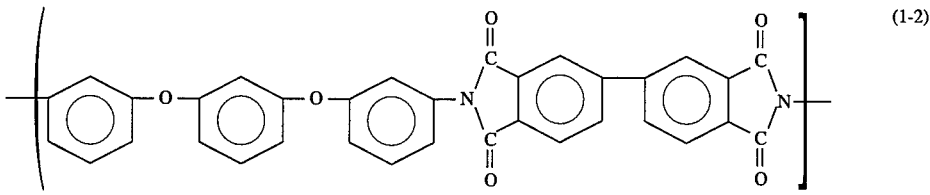

in an amount of more than 0.5 to less than 1.0 mole per mole of the polymer molecule and recurring structural units of the formula (2-1):

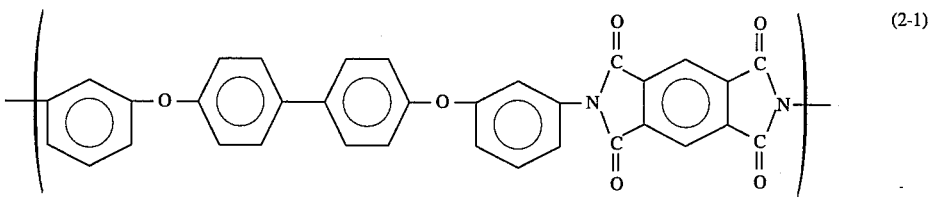

and/or recurring structural units of the formula (2-2):

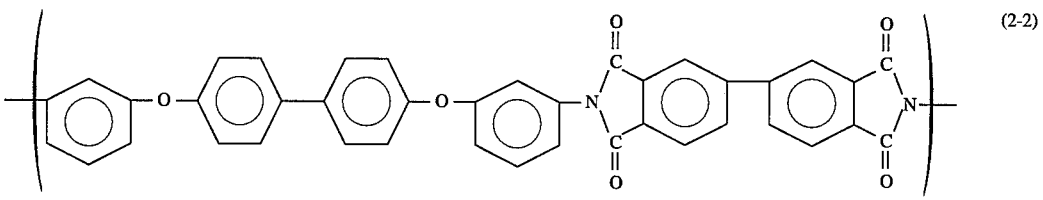

in an amount of more than 0 to less than 0.5 mole per mole of the polymer molecule.

When the recurring structural units include both the formula (2-1) and the formula (2-2) in these polyimide copolymers, no particular restriction is imposed upon the proportion between these two kinds of units and they can be used in an arbitrary proportion.

Other polyimide copolymers comprising recurring structural units of the formula (1-1) and those of the formula (1-2) in an arbitrary proportion are also included in the scope of the invention.

The above homopolymers and copolymers of polyimide can comprise polyimide having other recurring structural units in a range of giving no hindrance on the effect of the invention.

The above homopolymers and copolymers of polyimide are preferably capped at the polymer chain end with aromatic dicarboxylic anhydride represented by the formula (3):

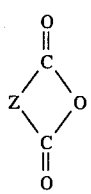

wherein Z is a divalent radical having 6–15 carbon atoms and is a monoaromatic radical, condensed polyaromatic radical or noncondensed aromatic radical connected to each other with a direct bond or a bridge member, and/or an aromatic monoamine represented by the formula (4):

$$V-NH_2 \qquad (4)$$

wherein V is a monovalent radical having 6–15 carbon atoms and is a monoaromatic radical, condensed polyaromatic radical or noncondensed aromatic radical connected to each other with a direct bond or bridge member.

Polyimide used in the invention has an inherent viscosity of 0.45 dl/g or more, preferably 0.50 dl/g or more. The inherent viscosity is measured by heat-dissolving 0.5 g polyimide powder in 100 ml of a solvent mixture of p-chlorophenol/phenol (9:1) and cooling the obtained solution to 35° C. When the inherent viscosity is less than 0.45 dl/g, the polyimide resin composition comprised of the polyimide resin and reinforcements cannot provide good fatigue resistance for the injection molded article obtained from the polyimide resin composition.

Polyimide which can be used in the invention and has an inherent viscosity of 0.45dl/g or more can be prepared by the following process.

Diamines used are 1,3-bis(3-aminophenoxy)benzene of the formula (5)

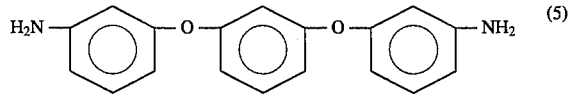

and 4,4'-bis(3-aminophenoxy)biphenyl of the formula (6):

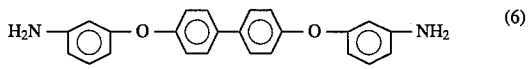

Tetracarboxylic dianhydrides used are pyromellitic dianhydride of the formula (7):

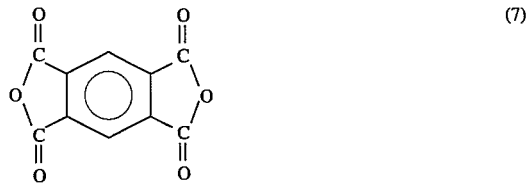

and 3,3', 4,4'-biphenyltetracarboxylic dianhydride of the formula (8):

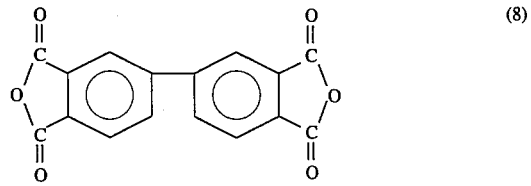

These diamines and tetracarboxylic dianhydrides are used by the following processes for preparing the homopolymers and copolymers of polyimide in the invention.

In the case of preparing the polyimide homopolymer consisting of recurring structural units of the formula (1-1) or the formula (1-2), or the polyimide copolymer consisting of recurring structural units of the formula (1-1) and those of the formula (1-2), the diamine of the formula (5) is individually reacted with tetracarboxylic dianhydride of the formula (7) or that of the formula (8), or reacted with a mixture of tetracarboxylic dianhydride of the formula (7) and that of the formula (8).

In the case of preparing the polyimide copolymer having recurring structural units represented by the formula (1) and those represented by the formula (2), a mixture of diamine of the formula (5) and diamine of the formula (6) is individually reacted with tetracarboxylic dianhydride of the formula (7) or that of the formula (8), or reacted with a mixture of tetracarboxylic dianhydride of the formula (7) and that of the formula (8).

When the diamine of the formula (5) and the diamine of the formula (6) are used as a mixture, the amount of diamine of the formula (5), i.e., 1,3-bis(3-aminophenoxy)benzene, is more than 0.5 to less than 1.0 mole per mole of the total diamine, and the amount of diamine of the formula (6), i.e., 4,4'-bis(3-aminophenoxy)biphenyl is less than 0.5 mole per mole of the total diamine.

When the amount of 4,4'-bis(3-aminophenoxy)biphenyl is 0.5 mole or more, the polyimide resin composition comprised of the polyimide resin and reinforcements has decreased processing ability and provides an injection molded article having low fatigue resistance.

In the case of using tetracarboxylic dianhydrides of the formulas (7) and (8) as a mixture, no particular limitation is imposed upon the proportion of these anhydrides. These anhydrides can be mixed in an arbitrary proportion.

One or more of other diamines and tetracarboxylic dianhydrides can be incorporated with the above raw materials in the polymerization as long as giving no adverse effect on the properties of polyimide.

Representative other diamines which can be added include, for example, m-phenylenediamine, o-phenylenediamine, p-phenylenediamine, m-aminobenzylamine, o-aminobenzylamine, p-aminobenzylamine, 3-chloro-1,2-phenylenediamine, 4-chloro-1,2-phenylenediamine, 2,3-diaminotoluene, 2,4-diaminotoluene, 2,5-diaminotoluene, 2,6-diaminotoluene, 3,4-diaminotoluene, 3,5-diaminotoluene, 2-methoxy-1,4-phenylenediamine, 4-methoxy-1,2-phenylenediamine, 4-methoxy-1,3-phenylenediamine, benzidine, 3,3'-dichlorobenzidine, 3,3'-dimethylbenzidine, 3,3'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfoxide, 3,4'-diaminodiphenyl sulfoxide, 4,4'-diaminodiphenyl sulfoxide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, 1,3-bis(4-aminophenoxy)benzene, 1,4'-bis(3-aminophenoxy)benzene, 1,4-bis(4-aminophenoxy)benzene, 1,3'-bis(3-aminobenzoyl)benzene, 1,4-bis(3-aminobenzoyl)benzene, 1,3'-bis(4-aminophenoxy)benzene, 1,4-bis(4-aminophenoxy)benzene, 3,3'-bis(3-aminophenoxy)biphenyl, 4,4'-bis(4-aminophenoxy)biphenyl, 3,3'-bis(4-aminophenoxy)biphenyl, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3',5,5'-tetramethylbiphenyl, 4,4'-bis(3-aminophenoxy)-3,3'-dichlorobiphenyl, 4,4'-bis(3-aminophenoxy)-3,5-dichlorobiphenyl, 4,4'-bis(3-aminophenoxy)-3,3',5,5'-tetrachlorobiphenyl, 4,4'-bis(3-aminophenoxy)-3,3'-dibromobiphenyl, 4,4'-bis(3-aminophenoxy)-3,5-dibromobiphenyl, 4,4'-bis(3-aminophenoxy)-3,3',5,5'-tetrabromobiphenyl, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 1,1-bis[4-(3-aminophenoxy)phenyl]propane, 1,1-bis[4-(4-aminophenoxy)phenyl]propane, 1,2-bis[4-(3-aminophenoxy)phenyl]propane, 1,2-bis[4-(4-aminophenoxy)phenyl]propane, 1,3-bis[4-(3-aminophenoxy)phenyl]propane, 1,3-bis[4-(4-aminophenoxy)phenyl]propane, 2,2-bis[4-(3-aminophenoxy)phenyl]propane, 2,2-bis[4-(4-aminophenoxy)phenyl]propane, 2-[4-(4-aminophenoxy)phenyl]-2-[4-(4-aminophenoxy)-3-methylphenyl]propane, 2,2-bis[4-(4-aminophenoxy)-3- methylphenyl]propane, 2-[4-(4-aminophenoxy)phenyl]-2-[4-(4-aminophenoxy)-3,5-dimethylphenyl]propane, 2,2-bis[4-(4-aminophenoxy)-3,5-dimethylphenyl]propane, 2,2-bis[4-(3-amlnophenoxy)phenyl]-1,1,1,3,3,3-hexafluoroProPane, 2,2-bis[4-(4-aminophenoxy)phenyl]-1,1,1,3,3,3-hexafluoroProPane, 2,2-bis[3-(3-aminophenoxy)phenyl]-1,1,1,3,3,3-hexafluoroProPane, 2,2-bis[3-(4-aminophenoxy)phenyl]-1,1,1,3,3,3-hexafluoroProPane, 1,1-bis[4-(3-aminophenoxy)phenyl]butane, 1,1-bis[4-(4-aminophenoxy)phenyl]butane, 1,2-bis[4-(3-amlnophenoxy)phenyl]butane, 1,2-bis[4-(4-amlnophenoxy)phenyl]butane, 1,3-bis[4-(3-aminophenoxy)phenyl]butane, 1,3-bis[4-(4-aminophenoxy)phenyl]butane, 1,4-bis[4-(3-amlnophenoxy)phenyl]butane, 1,4-bis[4-(4-aminophenoxy)phenyl]butane, 2,2-bis[4-(3-aminophenoxy)phenyl]butane, 2,2-bis[4-(4-aminophenoxy)phenyl]butane, 2,3-bis[4-(3-aminophenoxy)phenyl]butane, 2,3-bis[4-(4-aminophenoxy)phenyl]butane, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-amlnophenoxy)phenyl]sulfide, bis[3-(4-amlnophenoxy)phenyl]sulfide, bis[4-(3-amlnophenoxy)phenyl]sulfide, bis[4-(4-aminophenoxy)phenyl]sulfide, bis[4-(3-amlnophenoxy)-3-methoxyphenyl]sulfide, [4-(3-aminophenoxy)phenyl][4-(3-aminophenoxy)-3,5-dimethoxyphenyl]sulfide bis[4-(3-aminophenoxy)-3,5-dimethoxyphenyl]sulfide bis[3-(3-aminophenoxy)phenyl]sulfoxide, bis[4-(3-amlnophenoxy)phenyl]sulfoxide, bis[4-(4-amlnophenoxy)phenyl]sulfoxide, bis[3-(3-amlnophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, 1,3-bis[4-(3-ammnophenoxy)benzoyl]benzene, 1,3-bis[4-(4-ammnophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-ammnophenoxy)-α,α-dimethylbenzoyl]benzene, 1,3-bis[4-(3-aminophenoxy)-α,α-dimethylbenzoyl]benzene, 1,4-bis[4-(4-aminophenoxy)-α,α-dimethylbenzoyl]benzene and 1,4-bis[4-(3-ammnophenoxy)-α,α-dimethylbenzoyl]benzene.

These diamines can be used singly or as a mixture.

Exemplary tetracarboxylic dianhydrides which can be added to the above raw materials include ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(2,3-dicarboxyphenyl)ether dianhydride, bis(3,4-dicarboxyphenyl)ether dianhydride, bis(2,3-dicarboxyphenyl)sulfone dianhydride, bis(3,4-dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 1,2-bis(2,3-dicarboxyphenyl)ethane dianhydride, 1,2-bis(3,4-dicarboxyphenyl)ethane dianhydride, 1,3-bis(2,3-dicarboxyphenyl)ethane dianhydride, 1,3-bis(3,4-dicarboxyphenoxy)benzene dianhydride, 1,4-bis(2,3-dicarboxyphenoxy)benzene dianhydride, 1,4-bis(3,4-dicarboxyphenoxy)benzene dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride. These tetracarboxylic dianhydrides can be used singly or as a mixture.

Polyimides used in the invention is a homopolymer or a copolymer having the above recurring structural units obtained by using these diamines and tetracarboxylic dianhydrides as monomer components. These polyimides also include those having unsubstituted polymer chain end and those substituted at the polymer chain end with aromatic monoamine and/or aromatic dicarboxylic anhydride which have no reactivity with amine or dicarboxylic anhydride.

Polyimide substituted at the polymer chain end with aromatic monoamine and/or aromatic dicarboxylic anhydride can be prepared by reacting diamine of the formula (5), i.e., 1,3-bis(3-aminophenoxy)benzene, or a mixture of the same and diamine of the formula (6), i.e., 4,4'-bis(4-aminophenoxy)biphenyl, with tetracarboxylic dianhydride of the formula (7), i.e.,pyromellitic dianhydride, and/or tetracarboxylic dianhydride of the formula (8) i.e., 3,3',4,4'-biphenyltetracarboxylic dianhydride, in the presence of aromatic dicarboxylic anhydride of the formula (3)

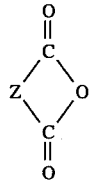

(3)

wherein Z is a divalent radical having 6–15 carbon atoms and is a monoaromatic radical, condensed polyaromatic radical or noncondensed aromatic radical connected to each other with a direct bond or a bridge member, and/or aromatic monoamine of the formula (4):

V—NH$_2$ (4)

wherein V is a monovalent radical having 6–15 carbon atoms and is a monoaromatic radical, condensed polyaromatic radical or noncondensed aromatic radical connected to each other with a direct bond or a bridge member.

Exemplary aromatic dicarboxylic anhydrides of the formula (3) include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride.

These dicarboxylic anhydrides can be substituted with a radical having no reactivity with amine or dicarboxylic anhydride, and can be used singly or as a mixture.

Phthalic anhydride is most preferred in these aromatic dicarboxylic anhydrides in view of properties and practical usage of resulting polyimide.

The amount of aromatic dicarboxylic anhydride is 0.001–1.0 mole per mole of 1,3-bis(3-aminophenoxy)benzene of the formula (5) or a mixture of the same with 4,4'-bis(3-aminophenoxy)biphenyl of the formula (6). When the amount is less than 0.001 mole, a viscosity increase is observed in molding at high temperature and leads to deterioration of molding ability. On the other hand, an amount exceeding 1.0 mole causes reduction of mechanical properties. Preferred amount is 0.01–0.5 mole.

Exemplary aromatic monoamines of the formula (4), for example, aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-amlnobenzaldehyde, m-aminobenzaldehyde, p-aminobenzaldehyde, o-amlnobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene, and 9-aminoanthracene.

These aromatic monoamines can be substituted with a radical having no reactivity for amine or dicarboxylic anhydride and can be used singly or as a mixture.

The amount of aromatic monoamine is 0.001–1.0 mole per mole of tetracarboxylic dianhydride of the formula (7), i.e., pyromellitic dianhydride and/or tetracarboxylic dianhydride of the formula (8), i.e., 3,3',4,4'-biphenyltetracarboxylic dianhydride. When the amount is less than 0.001 mole, viscosity increases in the high temperature processing step and results in deterioration of processing ability. On the other hand, an amount exceeding 1.0 mole leads to reduction of mechanical properties. Thus, preferred amount is 0.01–0.5 mole.

Polyimide used in the invention can be prepared by any known processes. Known processes include, for example:

1) a process for preparing polyamic acid in an organic solvent, isolating polyamic acid by removing the solvent under reduced pressure or by pouring a resultant polyamic acid solution into a lean solvent, and imidizing the isolated polyamic acid by heating to obtain polyimide, 2) a process for obtaining a polyamic acid solution by the same procedures as described in 1), adding a dehydrating agent such as acetic anhydride and a catalyst, if required, to carry out chemical imidization, isolating polyimide by known procedures, and successively carrying out washing and drying when necessary, 3) a process for obtaining a polyamic acid solution by the same procedures as described in 1) and successively carrying out solvent removal and heat imidization at the same time by heating under reduced pressure, and 4) a process for charging raw materials into an organic solvent, heating the mixture to simultaneously carry out preparation and imidization of polyamic acid in the presence of, if necessary, a catalyst, azeotropic agent and dehydrating agent.

Preparation of polyimide is particularly preferred to carry out in a solvent. Exemplary organic solvents which can be used include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These solvents can be used singly or as a mixture.

In the preparation process of polyimide, addition and reaction of diamines, tetracarboxylic dianhydrides and aromatic dicarboxylic anhydride or aromatic monoamine in an organic solvent can be carried out by the following methods.

(a) A method for reacting tetracarboxylic dianhydride with diamine and successively adding aromatic dicarboxylic anhydride or aromatic monoamine to continue the reaction.

(b) A method for reacting aromatic dicarboxylic anhydride with diamine and successively adding tetracarboxylic dianhydride to continue the reaction, or reacting tetracarboxylic dianhydride with aromatic monoamine and successively adding diamine to continue the reaction.

(c) A method for adding tetracarboxylic dianhydride, diamine and aromatic dicarboxylic anhydride or aromatic monoamine are added at the same time to carry out the reaction.

Any of the above methods can be carried out without difficulty.

The polymerization and imidization reaction is usually carried out at a temperature of 300° C. or less. No particular limitation is imposed upon the pressure in the polymerization and imidization reaction. The reaction can be satisfactorily carried out under atmospheric pressure. The reaction time of polymerization and imidization differs depending upon the kind of diamine, tetracarboxylic dianhydride and solvent and reaction temperature. Reaction time of 4–24 hours is usually sufficient.

Polyimide used for the invention can be prepared by the above processes.

The polyimide composition of the invention is prepared by blending 100 parts by weight of the above polyimide resin, that is, a homopolymer or copolymer of polyimide having an inherent viscosity of 0.45 dl/g or more, preferably 0.50 dl/g or more, with 5–65 parts by weight, preferably 10–50 parts by weight of reinforcements such as a carbon fiber, glass fiber, aromatic polyamide fiber and/or potassium titanate fiber.

When the amount of the reinforcements is less than 5 parts by weight, sufficient reinforcing effect cannot be obtained. On the other hand, an amount exceeding 65 parts by weight deteriorates injection molding ability of the polyimide resin composition itself, and cannot provide a good injection molded article.

Addition of the reinforcements to the polyimide resin can be carried out by conventional methods. For example, in the most common method, polyimide powder and reinforcements are premixed with a mortar, Henschel mixer, drum blender, ball mill and ribbon blender and successively kneaded with a melt mixer or hot rolls to obtain pellets or powdery mixture.

The polyimide resin composition of the invention can be practically applied to melt-processing such as injection molding, extrusion forming, compression molding, rotary molding and other various known processing methods. Polyimide used in the invention has excellent melt flowability in particular, and thus the polyimide resin composition of the invention can be most preferably applied to injection molding process in view of operation efficiency.

Other resin components can be added to the polyimide resin composition of the invention in the range giving no adverse effect on the object of the invention.

Exemplary other resins which can be formulated in a suitable amount depending upon the object include thermoplastic resin such as polyethylene, polypropylene, polycarbonate, polyarylate, polyamide, polysulfone, polyether sulfone, polyether ketone, polyphenylene sulfide polyamideimide, modified polyphenyleneoxide, polyimide, polyetherimide, and thermosetting resins.

Solid lubricants such as molybdenum disulfide, graphite, boron nitride, lead monoxide and lead powder can also be added singly or as a mixture.

Further, antioxidant, heat stabilizer, ultraviolet absorber, flame retardant, antistatic agent, colorant and other usual additives can also be added singly or as a mixture.

The injection molded article of the invention can be obtained in a variety of shapes from the polyimide resin composition of the invention by changing the form of the mold in an injection molding machine.

That is, the molded article of the invention can be expected to be used for automobile parts such as a bubble lifter and impeller which require particularly excellent dynamic fatigue properties.

The present invention will hereinafter be illustrated further in detail by way of synthetic examples, examples and comparative examples.

In these examples, properties were measured by the following methods.
Inherent viscosity:
Measured after dissolving 0.50 g of polyimide powder in 100 ml of a solvent mixture qmsefmtd of p-chlorophenol and phenol in a weight ratio of 90:10 and cooling the obtained solution to 35° C.
Glass transition temperature (Tg):
Measured by DSC with a Shimadzu DT-40 Series, DSC-41M at a temperature rise rate of 16° C./min.
5% Weight loss temperature:
Measured by DTA-Tg in the air with a Shimadzu DT-40 Series, DSC-40 M at a temperature rise rate of 10° C./min.

Synthetic Example 1

To a reaction vessel equipped with a stirrer, reflux condenser, water separator and nitrogen inlet tube, 2.338 kg (8.00 moles) of 1,3-bis(3-aminophenoxy)benzene, 736.8 g (2.00 moles) of 4,4'-bis(3-aminophenoxy)biphenyl, 2.159 kg(9.90 moles) of pyromellitic dianhydride, 138 g (1.5 moles) of γ-picoline and 20.9 kg of m-cresol were charged. The mixture was heated to 145° C. with stirring in a nitrogen atmosphere while distilling out about 340 g of water. The reaction was further continued at 140°–150° C. for 4 hours. Thereafter the reaction mixture was cooled to room temperature, poured into 72.9 g of methyl ethyl ketone, and filtered.

The filtered mass was further washed with methyl ethyl ketone, and dried at 50° C. for 24 hours and then at 200° C. for 6 hours in a nitrogen atmosphere. Polyimide powder thus obtained was 4.79 g (98.2% yield).

The polyimide powder had an inherent viscosity of 0.74 dl/g, Tg of 220° C., and 5% weight loss temperature of 549° C. in air.

Synthetic Example 2

The same procedures as described in Synthetic Example 1 were carried out except that 2.159 kg (9.90 moles) of pyromellitic dianhydride was replaced by 2.883 kg (9.80 moles) of 3,3',4,4'-biphenyltetracarboxylic dianhydride. Polyimide powder obtained was 5.49 kg (98.0% yield). The polyimide powder had an inherent viscosity of 0.76 dl/g, Tg of 206° C., and 5% weight loss temperature of 545° C. in air.

Synthetic Example 3

The same procedures as described in Synthetic Example 1 were carried out except that 2.338 kg (8.00 moles) of 1,3-bis(3-aminophenoxy) benzene and 736.8 g(2.00 moles) of 4,4'-bis(3-aminophenoxy)biphenyl were replaced by 2.923 kg (10.0 moles) of 1,3-bis(3-aminophenoxy)benzene. Polyimide powder thus obtained was 4.64 kg (98.2% yield). The polyimide powder had an inherent viscosity of 0.74 dl/g, Tg of 213° C., and 5% weight loss temperature of 536° C. in air.

Synthetic Example 4

The same procedures as described in Synthetic Example 3 were carried out except that 2.159 kg (9.90 moles) of pyromellitic dianhydride was replaced by 2.883 kg (9.80 moles) of 3,3',4,4'-biphenyltetracarboxylic dianhydride. Polyimide powder thus obtained was 5.36 kg (98.5% yield).

The polyimide powder had an inherent viscosity of 0.80 dl/g, Tg of 199° C., and 5% weight loss temperature of 545° C. in air.

Synthetic Example 5

The same procedures as described in Synthetic Example 1 were carried out except that 29.5 g (0.20 mole) of phthalic anhydride was added in the reaction. Polyimide powder thus obtained was 4.83 kg (98.6% yield). The polyimide powder had an inherent viscosity of 0.73 dl/g, Tg of 218° C., and 5% weight loss temperature of 558° C. in air.

Synthetic Example 6

The same procedures as described in Synthetic Example 2 were carried out except that 59.0 g (0.4 mole) of phthalic anhydride was added in the reaction. Polyimide powder thus obtained was 5.59 kg (98.8% yield). The polyimide powder had an inherent viscosity of 0.74 dl/g, Tg of 205° C., and 5% weight loss temperature of 559° C. in air.

Synthetic Example 7

The same procedures as described in Synthetic Example 3 were carried out except that 29.5 g (0.2 mole) of phthalic anhydride was added in the reaction. Polyimide powder thus obtained was 4.69 kg (98.7% yield). The polyimide powder had an inherent viscosity of 0.72 dl/g, Tg of 212° C., and 5% weight loss temperature of 556° C. in air.

Synthetic Example 8

The same procedures as described in Synthetic Example 4 were carried out except that 59.0 g (0.4 mole) of phthalic anhydride was added in the reaction. Polyimide powder thus obtained was 5.41 kg (98.2% yield). The polyimide powder had an inherent viscosity of 0.78 dl/g, Tg of 198° C., and 5% weight loss temperature of 555° C. in air.

Synthetic Example 9–40

Polyimide was prepared from various diamines and acid anhydrides. Results are illustrated in Table 1–5.

TABLE 1

| Synthetic Example | Diamine *1 (mol) | Acid *2 anhydride (mol) | Capping agent *3 (mol) | Yield (%) | η inh (dl/g) | Tg (°C.) | Td 5 (°C.) |
|---|---|---|---|---|---|---|---|
| 9 | APB/m-BP 5.10/4.90 | PMDA 9.90 | PA 0.20 | 98.0 | 0.73 | 232 | 556 |
| 10 | APB/m-BP 5.10/4.90 | BPDA 9.80 | PA 0.40 | 98.5 | 0.77 | 214 | 558 |
| 11 | APB/m-BP 4.00/6.00 | PMDA 9.90 | PA 0.20 | 98.3 | 0.74 | 238 | 562 |
| 12 | APB/m-BP 4.00/6.00 | BPDA 9.80 | PA 0.40 | 98.8 | 0.77 | 221 | 556 |
| 13 | APB/m-BP 8.00/2.00 | PMDA 9.75 | PA 0.50 | 98.8 | 0.48 | 214 | 553 |
| 14 | APB/m-BP 8.00/2.00 | BPDA 9.60 | PA 0.80 | 98.7 | 0.51 | 198 | 552 |
| 15 | APB 10.0 | PMDA 9.80 | PA 0.40 | 98.8 | 0.51 | 210 | 552 |

Note:
*1 APB: 1,3-bis(3-aminophenoxy)benzene
m-BP: 4,4'-bis(3-aminophenoxy)biphenyl
*2 PMDA: pyromellitic dianhydride
BPDA: 3,3',4,4'-biphenyltetracarboxylic dianhydride
*3 PA: phthalic anhydride

TABLE 2

| Synthetic Example | Diamine *1 (mol) | Acid *2 anhydride (mol) | Capping agent *3 (mol) | Yield (%) | η inh (dl/g) | Tg (°C.) | Td 5 (°C.) |
|---|---|---|---|---|---|---|---|
| 16 | APB 10.0 | BPDA 9.60 | PA 0.80 | 98.5 | 0.50 | 195 | 560 |
| 17 | APB 10.0 | PMDA 9.70 | PA 0.60 | 97.3 | 0.43 | 209 | 550 |
| 18 | APB 10.0 | BPDA 9.40 | PA 1.20 | 97.2 | 0.43 | 192 | 555 |
| 19 | APB/m-BP 8.00/2.00 | PMDA 9.90 | NA 0.20 | 98.0 | 0.73 | 218 | 556 |
| 20 | APB 10.0 | PMDA 9.90 | NA 0.20 | 98.0 | 0.73 | 213 | 545 |
| 21 | APB 10.0 | BPDA 9.80 | NA 0.40 | 98.5 | 0.79 | 200 | 564 |
| 22 | APB/m-BP 7.92/1.98 | PMDA 10.0 | AN 0.20 | 98.3 | 0.74 | 217 | 556 |

Note:
*1 APB: 1,3-bis(3-aminophenoxy)benzene
m-BP: 4,4'-bis(3-aminophenoxy)biphenyl
*2 PMDA: pyromellitic dianhydride
BPDA: 3,3',4,4'-biphenyltetracarboxylic dianhydride
*3 PA: phthalic anhydride
NA: 1,8-naphthalene dicarboxylic anhydride
AN: aniline

TABLE 3

| Synthetic Example | Diamine *1 (mol) | Acid *2 anhydride (mol) | Capping agent *3 (mol) | Yield (%) | η inh (dl/g) | Tg (°C.) | Td 5 (°C.) |
|---|---|---|---|---|---|---|---|
| 23 | APB/m-BP 7.84/1.96 | BPDA 10.0 | AN 0.40 | 98.6 | 0.73 | 203 | 555 |
| 24 | APB/m-BP 7.84/1.96 | PMDA 10.0 | AN 0.40 | 98.3 | 0.50 | 214 | 552 |
| 25 | APB/m-BP 7.68/1.92 | BPDA 10.0 | AN 0.80 | 98.2 | 0.49 | 201 | 551 |
| 26 | APB/m-BP 7.76/1.94 | PMDA 10.0 | AN 0.60 | 98.0 | 0.43 | 211 | 550 |
| 27 | APB/m-BP 7.52/1.88 | BPDA 10.0 | AN 1.20 | 97.8 | 0.43 | 199 | 551 |
| 28 | APB 9.90 | PMDA 10.0 | AN 0.20 | 98.4 | 0.72 | 212 | 549 |
| 29 | APB 9.80 | BPDA 10.0 | AN 0.40 | 98.6 | 0.78 | 198 | 562 |

Note:
*1 APB: 1,3-bis(3-aminophenoxy)benzene
m-BP: 4,4'-bis(3-aminophenoxy)biphenyl
*2 PMDA: pyromellitic dianhydride
BPDA: 3,3',4,4'-biphenyltetracarboxylic dianhydride
*3 PA: aniline

TABLE 4

| Synthetic Example | Diamine *1 (mol) | Acid *2 anhydride (mol) | Capping agent *3 (mol) | Yield (%) | η inh (dl/g) | Tg (°C.) | Td 5 (°C.) |
|---|---|---|---|---|---|---|---|
| 30 | APB 9.80 | PMDA 10.0 | AN 0.40 | 98.0 | 0.52 | 210 | 540 |
| 31 | APB 9.60 | BPDA 10.0 | AN 0.80 | 98.5 | 0.49 | 194 | 560 |
| 32 | APB 9.70 | PMDA 10.0 | AN 0.60 | 98.2 | 0.43 | 208 | 536 |
| 33 | APB 9.40 | BPDA 10.0 | AN 1.20 | 98.3 | 0.44 | 191 | 552 |
| 34 | APB/m-BP 7.92/1.98 | PMDA 10.0 | p-T 0.20 | 98.7 | 0.72 | 223 | 559 |
| 35 | APB 9.90 | PMDA 10.0 | p-T 0.20 | 98.2 | 0.73 | 213 | 538 |
| 36 | APB 9.80 | BPDA 10.0 | p-T 0.40 | 98.0 | 0.79 | 198 | 559 |

Note:
*1 APB: 1,3-bis(3-aminophenoxy)benzene
m-BP: 4,4'-bis(3-aminophenoxy)biphenyl
*2 PMDA: pyromellitic dianhydride
BPDA: 3,3',4,4'-biphenyltetracarboxylic dianhydride
*3 AN: aniline
p-T: p-toluidine

TABLE 5

| Synthetic Example | Diamine *1 (mol) | Acid *2 anhydride (mol) | Capping agent *3 (mol) | Yield (%) | η inh (dl/g) | Tg (°C.) | Td 5 (°C.) |
|---|---|---|---|---|---|---|---|
| 37 | APB 10.0 | PMDA/BPDA 4.8/5.0 | PA 0.40 | 98.2 | 0.62 | 208 | 550 |
| 38 | APB 9.80 | PMDA/BPDA 2.0/8.0 | AN 0.40 | 98.4 | 0.70 | 202 | 556 |
| 39 | APB/m-BP 8.0/2.0 | PMDA/BPDA 4.8/5.0 | PA 0.40 | 98.3 | 0.65 | 210 | 551 |
| 40 | APB/m-BP 7.84/1.96 | PMDA/BPDA 2.0/8.0 | AN 0.40 | 98.5 | 0.72 | 204 | 557 |

TABLE 5-continued

| Synthetic Example | Diamine *1 (mol) | Acid *2 anhydride (mol) | Capping agent *3 (mol) | Yield (%) | η inh (dl/g) | Tg (°C.) | Td 5 (°C.) |
|---|---|---|---|---|---|---|---|

Note:
*1 APB: 1,3-bis(3-aminophenoxy)benzene
m-BP: 4,4'-bis(3-aminophenoxy)biphenyl
*2 PMDA: pyromellitic dianhydride
BPDA: 3,3',4,4'-biphenyltetracarboxylic dianhydride
*3 PA: Phthalic dianhydride
p-T: p-toluidine

EXAMPLES 1–3

To 100 parts by weight of polyimide powder obtained in Synthetic Example 1, 40 parts by weight of the carbon fiber, HTA-C6 (Trade Mark of Toho Rayon Co.) was added and mixed with a drum blender (manufactured by Kawata Seisakusho Co.). Successively the mixture was melt kneaded at 400° C. with a single screw extruder having a bore diameter of 30 mm. Extruded strand was cooled in the air and cut into pellets. The pellets were injection molded into a tensile test specimen with an Arburg injection molding machine at an injection pressure of 500 kg/cm$^2$, cylinder temperature of 410° C. and mold temperature of 180° C. The number of repeated deflection to fatigue (fatigue life) was measured on the specimen by using a partial pulsating method in accordance with JIS-K 7118. Load (exciting stress) and fatigue life are summarized in Table 6.

EXAMPLES 4–84

The same procedures as described in Example 1 were carried out by using the polyimide powder obtained in Synthetic Examples 2–10, 13–16, 19–25, 28–31 and 34–36. Fatigue life was measured by using the tensile test specimens thus prepared. Results are illustrated in Tables 6–9.

EXAMPLES 85–102

The same procedures as described in Example 1 were carried out except that the polyimide powder obtained in Synthetic Examples 5–8 was used and carbon fiber, HTA-C 6 (Toho Rayon Co.) was replaced by the glass fiber, MICROGLASS-RES (Trade Mark of Nippon Sheet Glass Co.) or the aramide fiber, KEBLER CHOPPED STRAND K-49 (Trade Mark of E. I. Du Pont de Nemours & Co.). Fatigue life was measured by using the tensile test specimens thus prepared. Results are illustrated in Table 10.

COMPARATIVE EXAMPLES 1–6

The same procedures as described in Example 1 were carried out by using polyimide powder obtained in Synthetic Examples 11 and 12. Fatigue life was measured on the tensile test specimens thus prepared. Results are illustrated in Table 11.

AS seen in the above results, polyimide of Synthetic Example 11 or 12 wherein the proportion of APB is less than 50 mol % leads to lower fatigue resistance of the resulting resin compositions. That is, fatigue life (the number of repeated deflections to fatigue) of these compositions under a certain load (exciting stress) is one order or more of magnitude shorter than that of polyimide having 50 mol % or more in APB proportion.

COMPARATIVE EXAMPLES 7–24

The same procedures as described in Example 1 were carried out by using the polyimide powder obtained in Synthetic Examples 17, 18, 26, 27, 32 and 33. Fatigue life of the tensile test specimens thus obtained was measured and results are illustrated in Table 12.

As seen in the above results, the resin composition having an inherent viscosity of 0.45 dl/g or more has excellent fatigue resistance. On the other hand, polyimide of Synthetic Examples 17, 18, 26, 27, 32 and 33 having an inherent viscosity of less than 0.45 dl/g leads to lower fatigue resistance of resulting resin compositions. That is, fatigue life of these resin compositions under a certain load is one order or more of magnitude shorter than that of polyimide having an inherent viscosity of 0.45 dl/g or more.

EXAMPLES 103–120

The same procedures as described in Example 1 were carried out by using 100 parts by weight of the polyimide powder obtained in Synthetic Example 5 or 7 and changing the amount of fiber added. Load and fatigue life were measured on the test specimens thus obtained. Results are illustrated in Tables 13 and 14.

COMPARATIVE EXAMPLES 25–36

The same procedures as described in Examples 103–120 were carried out by using resin compositions outside the scope of the invention. Load and fatigue life were measured on the test specimens thus obtained. Results are illustrated in Tables 13 and 14.

When the amount of carbon fiber used was in the range of the invention, the resin composition exhibited excellent fatigue resistance. On the other hand, when the amount of carbon fiber was lower than the range of the invention, good fatigue resistance could not be obtained. When the amount of the carbon fiber exceeded the range of the invention, injection molding became impossible and molded articles could not be obtained.

EXAMPLES 121–132

The same procedures as described in Example 1 were carried out by using 100 parts by weight of the polyimide powder obtained in Synthetic Example 37–40 and changing the amount of carbon fiber added. Load and fatigue life were measured on the test specimens thus obtained. Results are illustrated in Table 15.

TABLE 6

| Example | Polyimide synthetic example | Fiber | Load (kg/mm$^2$) | Fatigue life (× 10$^4$ cycle) |
|---|---|---|---|---|
| 1 | 1 | carbon | 14 | 26 |
| 2 | 1 | ↑ | 13 | 182 |
| 3 | 1 | ↑ | 12 | 1010 |
| 4 | 2 | ↑ | 14 | 28 |
| 5 | 2 | ↑ | 13 | 196 |
| 6 | 2 | ↑ | 12 | 1130 |
| 7 | 3 | ↑ | 14 | 34 |
| 8 | 3 | ↑ | 13 | 210 |
| 9 | 3 | ↑ | 12 | 1240 |
| 10 | 4 | ↑ | 14 | 42 |
| 11 | 4 | ↑ | 13 | 320 |
| 12 | 4 | ↑ | 12 | 5310 |
| 13 | 5 | ↑ | 14 | 27 |
| 14 | 5 | ↑ | 13 | 188 |
| 15 | 5 | ↑ | 12 | 1060 |
| 16 | 6 | ↑ | 14 | 30 |
| 17 | 6 | ↑ | 13 | 203 |
| 18 | 6 | ↑ | 12 | 1150 |
| 19 | 7 | ↑ | 14 | 35 |
| 20 | 7 | ↑ | 13 | 213 |
| 21 | 7 | ↑ | 12 | 1250 |

TABLE 7

| Example | Polyimide synthetic example | Fiber | Load (kg/mm$^2$) | Fatigue life (× 10$^4$ cycle) |
|---|---|---|---|---|
| 22 | 8 | carbon | 14 | 53 |
| 23 | 8 | ↑ | 13 | 320 |
| 24 | 8 | ↑ | 12 | 5380 |
| 25 | 9 | ↑ | 14 | 21 |
| 26 | 9 | ↑ | 13 | 100 |
| 27 | 9 | ↑ | 12 | 1100 |
| 28 | 10 | ↑ | 14 | 29 |
| 29 | 10 | ↑ | 13 | 185 |
| 30 | 10 | ↑ | 12 | 1250 |
| 31 | 13 | ↑ | 14 | 25 |
| 32 | 13 | ↑ | 13 | 176 |
| 33 | 13 | ↑ | 12 | 1030 |
| 34 | 14 | ↑ | 14 | 28 |
| 35 | 14 | ↑ | 13 | 192 |
| 36 | 14 | ↑ | 12 | 1070 |
| 37 | 15 | ↑ | 14 | 32 |
| 38 | 15 | ↑ | 13 | 204 |
| 39 | 15 | ↑ | 12 | 1180 |
| 40 | 16 | ↑ | 14 | 51 |
| 41 | 16 | ↑ | 13 | 351 |
| 42 | 16 | ↑ | 12 | 5190 |

TABLE 8

| Example | Polyimide synthetic example | Fiber | Load (kg/mm$^2$) | Fatigue life (× 10$^4$ cycle) |
|---|---|---|---|---|
| 43 | 19 | carbon | 14 | 26 |
| 44 | 19 | ↑ | 13 | 190 |
| 45 | 19 | ↑ | 12 | 1090 |
| 46 | 20 | ↑ | 14 | 34 |
| 47 | 20 | ↑ | 13 | 210 |
| 48 | 20 | ↑ | 12 | 1220 |
| 49 | 21 | ↑ | 14 | 54 |
| 50 | 21 | ↑ | 13 | 372 |
| 51 | 21 | ↑ | 12 | 5090 |
| 52 | 22 | ↑ | 14 | 25 |
| 53 | 22 | ↑ | 13 | 192 |
| 54 | 22 | ↑ | 12 | 1130 |
| 55 | 23 | ↑ | 14 | 31 |
| 56 | 23 | ↑ | 13 | 212 |
| 57 | 23 | ↑ | 12 | 1180 |
| 58 | 24 | ↑ | 14 | 26 |
| 59 | 24 | ↑ | 13 | 182 |
| 60 | 24 | ↑ | 12 | 1090 |
| 61 | 25 | ↑ | 14 | 26 |
| 62 | 25 | ↑ | 13 | 186 |
| 63 | 25 | ↑ | 12 | 1050 |

TABLE 9

| Example | Polyimide synthetic example | Fiber | Load (kg/mm$^2$) | Fatigue life (× 10$^4$ cycle) |
|---|---|---|---|---|
| 64 | 28 | carbon | 14 | 33 |
| 65 | 28 | ↑ | 13 | 211 |
| 66 | 28 | ↑ | 12 | 1240 |
| 67 | 29 | ↑ | 14 | 52 |
| 68 | 29 | ↑ | 13 | 348 |
| 69 | 29 | ↑ | 12 | 5160 |
| 70 | 30 | ↑ | 14 | 32 |
| 71 | 30 | ↑ | 13 | 200 |
| 72 | 30 | ↑ | 12 | 1190 |
| 73 | 31 | ↑ | 14 | 53 |
| 74 | 31 | ↑ | 13 | 338 |
| 75 | 31 | ↑ | 12 | 5020 |
| 76 | 34 | ↑ | 14 | 24 |
| 77 | 34 | ↑ | 13 | 186 |
| 78 | 34 | ↑ | 12 | 1050 |
| 79 | 35 | ↑ | 14 | 34 |
| 80 | 35 | ↑ | 13 | 213 |
| 81 | 35 | ↑ | 12 | 1230 |
| 82 | 36 | ↑ | 14 | 55 |
| 83 | 36 | ↑ | 13 | 352 |
| 84 | 36 | ↑ | 12 | 5260 |

TABLE 10

| Example | Polyimide synthetic example | Fiber | Load (kg/mm$^2$) | Fatigue life (× 10$^4$ cycle) |
|---|---|---|---|---|
| 85 | 5 | Glass | 14 | 25 |
| 86 | 5 | ↑ | 13 | 175 |
| 87 | 5 | ↑ | 12 | 1010 |
| 88 | 6 | ↑ | 14 | 28 |
| 89 | 6 | ↑ | 13 | 196 |
| 90 | 6 | ↑ | 12 | 1080 |
| 91 | 7 | ↑ | 14 | 32 |
| 92 | 7 | ↑ | 13 | 205 |
| 93 | 7 | ↑ | 12 | 1150 |
| 94 | 8 | ↑ | 14 | 49 |
| 95 | 8 | ↑ | 13 | 359 |
| 96 | 8 | ↑ | 12 | 4820 |
| 97 | 5 | aramide | 14 | 31 |
| 98 | 5 | ↑ | 13 | 192 |
| 99 | 5 | ↑ | 12 | 1160 |
| 100 | 6 | ↑ | 14 | 31 |
| 101 | 6 | ↑ | 13 | 219 |
| 102 | 6 | ↑ | 12 | 1250 |

TABLE 11

| Comparative example | Polyimide synthetic example | Fiber | Fatigue resistance of injection molded article | |
|---|---|---|---|---|
| | | | Load (kg/mm$^2$) | Fatigue life (× 10$^4$ cycle) |
| 1 | 11 | Carbon | 14 | 2.0 |
| 2 | 11 | ↑ | 13 | 12 |
| 3 | 11 | ↑ | 12 | 93 |
| 4 | 12 | ↑ | 14 | 2.2 |
| 5 | 12 | ↑ | 13 | 14 |
| 6 | 12 | ↑ | 12 | 95 |

TABLE 12

| Comparative example | Polyimide synthetic example | Fiber | Fatigue resistance of injection molded article | |
|---|---|---|---|---|
| | | | Load (kg/mm$^2$) | Fatigue life (× 10$^4$ cycle) |
| 7 | 17 | Carbon | 14 | 2.3 |
| 8 | 17 | ↑ | 13 | 13 |
| 9 | 17 | ↑ | 12 | 98 |
| 10 | 18 | ↑ | 14 | 3.9 |
| 11 | 18 | ↑ | 13 | 26 |
| 12 | 18 | ↑ | 12 | 157 |
| 13 | 26 | ↑ | 14 | 1.2 |
| 14 | 26 | ↑ | 13 | 9 |
| 15 | 26 | ↑ | 12 | 78 |
| 16 | 27 | ↑ | 14 | 1.5 |
| 17 | 27 | ↑ | 13 | 10 |
| 18 | 27 | ↑ | 12 | 108 |
| 19 | 32 | ↑ | 14 | 2.5 |
| 20 | 32 | ↑ | 13 | 15 |
| 21 | 32 | ↑ | 12 | 94 |
| 22 | 33 | ↑ | 14 | 4.33 |
| 23 | 33 | ↑ | 13 | 32 |
| 24 | 33 | ↑ | 12 | 162 |

TABLE 13

| Example(E) or Comparative example (C.E.) | Polyimide synthetic example | Fiber | Weight parts | Fatigue resistance of injection molded article | |
|---|---|---|---|---|---|
| | | | | Load (kg/mm$^2$) | Fatigue life (× 10$^4$ cycle) |
| C.E.-25 | 5 | carbon | 3 | 13 | 11 |
| E-103 | 5 | ↑ | 10 | 13 | 152 |
| E-104 | 5 | ↑ | 30 | 13 | 188 |
| E-105 | 5 | ↑ | 50 | 13 | 204 |
| C.E.-26 | 5 | ↑ | 70 | 13 | *1 |
| C.E.-27 | 5 | Glass | 3 | 13 | 9 |
| E-106 | 5 | ↑ | 10 | 13 | 148 |
| E-107 | 5 | ↑ | 30 | 13 | 175 |
| E-108 | 5 | ↑ | 50 | 13 | 194 |
| C.E.-28 | 5 | ↑ | 70 | 13 | *1 |
| C.E.-29 | 5 | Aramide | 3 | 13 | 12 |
| E-109 | 5 | ↑ | 10 | 13 | 161 |
| E-110 | 5 | ↑ | 30 | 13 | 193 |
| E-111 | 5 | ↑ | 50 | 13 | 205 |
| C.E.-30 | 5 | ↑ | 70 | 13 | *1 |

*1 Injection molding was impossible because of high melt viscosity.

TABLE 14

| Example(E) or Comparative example (C.E.) | Polyimide synthetic example | Fiber | Weight parts | Fatigue resistance of injection molded article | |
|---|---|---|---|---|---|
| | | | | Load (kg/mm²) | Fatigue life (× 10⁴ cycle) |
| C.E.-31 | 7 | carbon | 3 | 13 | 12 |
| E-112 | 7 | ↑ | 10 | 13 | 195 |
| E-113 | 7 | ↑ | 30 | 13 | 208 |
| E-114 | 7 | ↑ | 50 | 13 | 240 |
| C.E.-32 | 7 | ↑ | 70 | 13 | *1 |
| C.E.-33 | 7 | Glass | 3 | 13 | 10 |
| E-115 | 7 | ↑ | 10 | 13 | 183 |
| E-116 | 7 | ↑ | 30 | 13 | 195 |
| E-117 | 7 | ↑ | 50 | 13 | 218 |
| C.E.-34 | 7 | ↑ | 70 | 13 | *1 |
| C.E.-35 | 7 | Aramide | 3 | 13 | 13 |
| E-118 | 7 | ↑ | 10 | 13 | 201 |
| E-119 | 7 | ↑ | 30 | 13 | 211 |
| E-120 | 7 | ↑ | 50 | 13 | 246 |
| C.E.-36 | 7 | ↑ | 70 | 13 | *1 |

*1 Injection molding was impossible because of high melt viscosity.

TABLE 15

| Example | Polyimide synthetic example | Fiber | Fatigue resistance of injection molded article | |
|---|---|---|---|---|
| | | | Load (kg/mm²) | Fatigue life (× 10⁴ cycle) |
| 121 | 37 | Carbon | 14 | 42 |
| 122 | 37 | ↑ | 13 | 294 |
| 123 | 37 | ↑ | 12 | 3260 |
| 124 | 38 | ↑ | 14 | 49 |
| 125 | 38 | ↑ | 13 | 338 |
| 126 | 38 | ↑ | 12 | 4380 |
| 127 | 39 | ↑ | 14 | 31 |
| 128 | 39 | ↑ | 13 | 220 |
| 129 | 39 | ↑ | 12 | 1370 |
| 130 | 40 | ↑ | 14 | 37 |
| 131 | 40 | ↑ | 13 | 293 |
| 132 | 40 | ↑ | 12 | 3010 |

What is claimed is:

1. An extremely fatigue-resistant polyimide resin composition comprising 100 parts by weight of polyimide having from 0.5 (exclusive) to 1.0 (inclusive) mole ratio of recurring structural units represented by the formula (1):

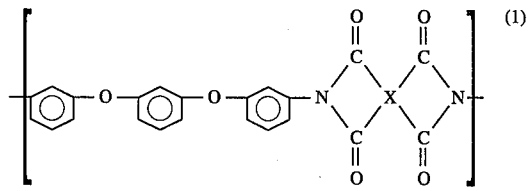

and from 0 (inclusive) to 0.5 (exclusive) mole ratio of recurring structural units represented by the formula (2):

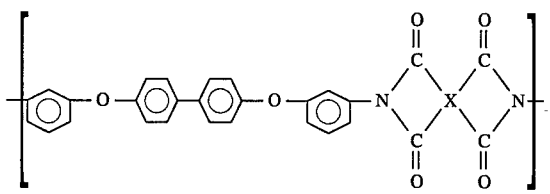

wherein X is

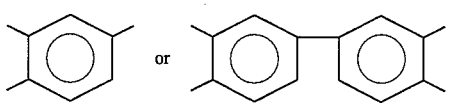

in the formulas (1) and (2), and having an inherent viscosity of 0.45 dl/g or more; and 5 to 65 parts by weight of at least one of carbon fiber, glass fiber, aromatic polyamide fiber and potassium titanate fiber.

2. An extremely fatigue-resistant polyimide resin composition comprising 100 parts by weight of polyimide having a polymer of capped molecular chain end obtained by preparing the polyimide of claim 1 in the presence of at least one of an aromatic dicarboxylic arthydride represented by the formula (3):

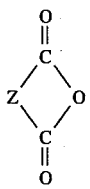

wherein Z is a divalent radical having 6 to 15 carbon atoms and is a monoaromatic radical, condensed polyaromatic radical or noncondensed aromatic radical connected to each other with a direct bond or a bridge member, and an aromatic monoamine represented by the formula (4):

$$V-NH_2 \qquad (4)$$

wherein V is a monovalent radical having 6 to 15 carbon atoms and is a monoaromatic radical, condensed polyaromatic radical or noncondensed aromatic radical connected to each other with a direct bond or a bridge member, and having an inherent viscosity of 0.45 dl/g or more; and 5 to 65 parts by weight of at least one of carbon fiber, glass fiber, aromatic polyamide fiber and potassium titante fiber.

3. An extremely fatigue-resistant polyimide resin composition comprising 100 parts by weight of polyimide having recurring structural units represented by the formula (1-1):

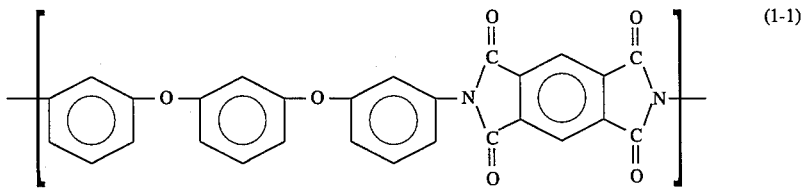

and having an inherent viscosity of 0.45 dl/g or more; and 5 to 65 parts by weight of at least one of carbon fiber, glass fiber, aromatic polyamide fiber and potassium titanate fiber.

4. An extremely fatigue-resistant polyimide resin composition comprising 100 parts by weight of polyimide having a polymer of capped molecular chain end obtained by preparing the polyimide of claim 3 in the presence of at least one of an aromatic dicarboxylic anhydride represented by the formula (3):

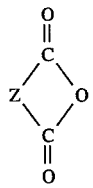

wherein Z is a divalent radical having 6 to 15 carbon atoms and is a monoaromatic radical, condensed polyaromatic radical or noncondensed aromatic radical connected to each other with a direct bond or a bridge member, and an aromatic monoamine represented by the formula (4):

V—NH$_2$ (4)

wherein V is a monovalent radical having 6 to 15 carbon atoms and is a monoaromatic radical, condensed polyaromatic radical or noncondensed aromatic radical connected to each other with a direct bond or a bridge member, and having an inherent viscosity of 0.45 dl/g or more; and 5 to 65 parts by weight of at least one of carbon fiber, glass fiber, aromatic polyamide fiber and potassium titante fiber, 5. An extremely fatigue-resistant polyimide resin composition comprising 100 parts by weight of polyimide having recurring structural units represented by the formula (1-2):

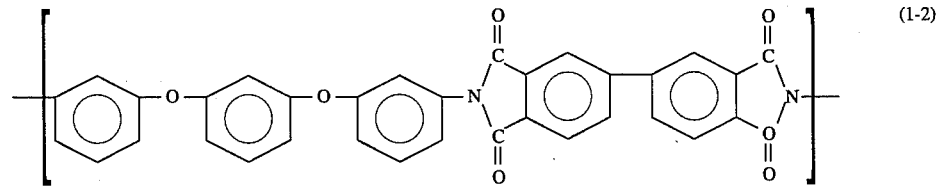

and having an inherent viscosity of 0.45 dl/g or more; and 5 to 65 parts by weight of at least one of carbon fiber, glass fiber, aromatic polyamide fiber and potassium titanate fiber.

6. An extremely fatigue-resistant polyimide resin composition comprising 100 parts by weight of polyimide having a polymer of capped molecular chain end obtained by preparing the polyimide of claim 5 in the presence of at least one of an aromatic dicarboxylic anhydride represented by the formula (3):

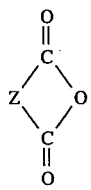

wherein Z is a divalent radical having 6 to 15 carbon atoms and is a monoaromatic radical, condensed polyaromatic radical or noncondensed aromatic radical connected to each other with a direct bond or a bridge member, and an aromatic monoamine represented by the formula (4):

V—NH$_2$ (4)

wherein V is a monovalent radical having 6 to 15 carbon atoms and is a monoaromatic radical, condensed polyaromatic radical or noncondensed aromatic radical connected to each other with a direct bond or a bridge member, and having an inherent viscosity of 0.45 dl/g or more; and 5 to 65 parts by weight of at least one of carbon fiber, glass fiber, aromatic polyamide fiber and potassium titanate fiber.

7. An extremely fatigue-resistant polyimide resin composition comprising 100 parts by weight of polyimide copolymer having from 0.5 (exclusive) to 1.0 (exclusive) mole ratio of recurring structunl units represented by the formula (1):

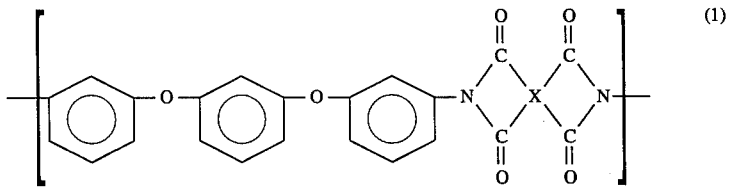

and from 0 (exclusive) to 0.5 (exclusive) mole ratio of recurring structural units represented by the formula (2):

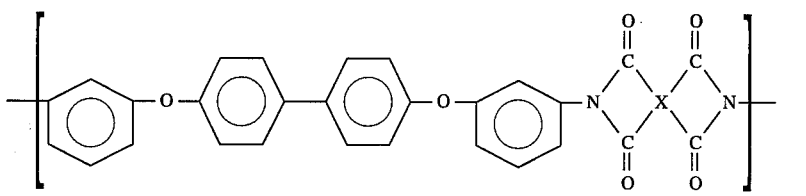

wherein X is

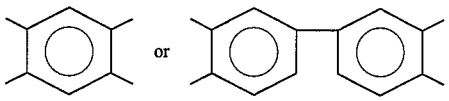

in the formulas (1) and (2), and having an inherent viscosity of 0.45 dl/g or more; and 5 to 65 parts by weight of at least one of carbon fiber, glass fiber, aromatic polyamide fiber and potassium titanate fiber.

8. An extremely fatigue-resistant polyimide resin composition comprising 100 parts by weight of polyimide having a polymer of capped molecular chain end obtained by preparing the polyimide copolymer of claim 7 in the presence of at least one of an aromatic dicarboxylic anhydride represented by the formula (3):

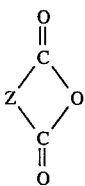

wherein Z is a divelent radical having 6 to 15 carbon atoms and is a monoaromatic radical, condensed polyaromatic radical or noncondensed aromatic radical connected to each other with a direct bond or a bridge member, and an aromatic monoamine represented by the formula (4):

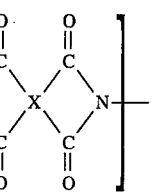

wherein V is a monovalent radical having 6 to 15 carbon atoms and is a monoaromatic radical, condensed polyaromatic radical or noncondensed aromatic radical connected to each other with a direct bond or a bridge member, and having an inherent viscosity of 0.45 dl/g or more; and 5 to 65 parts by weight of at least one of carbon fiber, glass fiber, aromatic polyamide fiber and potassium titanate fiber.

9. An injection molded article obtained from the polyimide resin composition as in claim 8.

10. An injection molded article obtained from the polyimide resin composition as in claim 7.

11. An injection molded article obtained from the polyimide resin composition as in claim 6.

12. An injection molded article obtained from the polyimide resin composition as in claim 5.

13. An injection molded article obtained from the polyimide resin composition as in claim 4.

14. An injection molded article obtained from the polyimide resin composition as in claim 3.

15. An injection molded article obtained from the polyimide resin composition as in claim 2.

16. An injection molded article obtained from the polyimide resin composition as in claim 1.

\* \* \* \* \*

UNITED STATES PATENT AND TRADEMARK OFFICE
CERTIFICATE OF CORRECTION

PATENT NO.   : 5,506,291
DATED        : April 9, 1996
INVENTOR(S)  : Okawa, et. al.

It is certified that error appears in the above-indentified patent and that said Letters Patent is hereby corrected as shown below:

In claim 1, col. 28, line 25, please amend the formula on the left to include the fourth bond as follows:

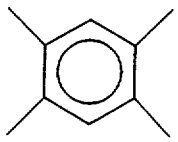 or 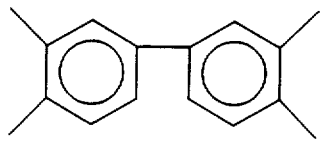

line 33, delete "caxbon" and insert --carbon--.

In claim 2, col. 28, line 39, delete "arthydride" and insert --anhydride--;

line 64, delete "titante" and insert --titanate--.

In claim 4, col. 29, line 40, delete "titante" and insert --titanate--.

In claim 7, col. 30, line 38, delete polyirnide" and insert --polyimide--.

In claim 8, col. 31, line 27, delete "anhydridc" and insert --anhydride--.

line 28, delete "fonnula" and insert --formula--;

line 37, delete "divelent" and insert --divalent--;

UNITED STATES PATENT AND TRADEMARK OFFICE
CERTIFICATE OF CORRECTION

PATENT NO. : 5,506,291
DATED : April 9, 1996
INVENTOR(S) : Okawa, et al

It is certified that error appears in the above-indentified patent and that said Letters Patent is hereby corrected as shown below:

In claim 8, col. 32, line 21, delete "polyamidc" and insert --polyamide--.

Signed and Sealed this

Twenty-sixth Day of November 1996

Attest:

BRUCE LEHMAN

Attesting Officer

Commissioner of Patents and Trademarks